United States Patent [19]

Mathieu

[11] 4,055,795
[45] Oct. 25, 1977

[54] CORRECTION SYSTEM FOR REGULATING THE POWER FACTOR OF AN ELECTRICAL NETWORK

[75] Inventor: Serge Mathieu, Ste-Foy, Canada
[73] Assignee: h.o.p. CONSULAB Inc., Canada
[21] Appl. No.: 705,462
[22] Filed: July 15, 1976
[51] Int. Cl.² .............................................. H02J 3/18
[52] U.S. Cl. .................................... 323/102; 318/179; 323/128
[58] Field of Search .................... 307/35, 59; 318/179; 323/102–107, 119, 127, 128

[56] References Cited

U.S. PATENT DOCUMENTS

| 3,300,712 | 1/1967 | Segsworth | 323/105 |
| 3,686,552 | 8/1972 | Peterson | 318/179 X |
| 3,703,680 | 11/1972 | Frank et al. | 323/128 X |
| 3,754,184 | 8/1973 | Stone | 323/102 |
| 3,921,070 | 11/1975 | Ringstad et al. | 323/102 X |

Primary Examiner—A. D. Pellinen
Attorney, Agent, or Firm—Cushman, Darby & Cushman

[57] ABSTRACT

A correction system for regulating the power factor of an electrical distribution network in which the phase difference between the potential V and the current I of a distribution line is measured. The voltage V and current I are detected, the phase difference between V and I measured, and the measured phase difference compared with first and second predetermined reference limits. When the measured phase difference is less than a first predetermined reference limit, capacitive loads may be added to the network, and when the phase difference exceeds a second reference limit greater than the first limit, the capacitive loads may be disconnected from the network. The actual demand is monitored and the capacitive loads connected only when the actual demand exceeds a predetermined demand value.

4 Claims, 3 Drawing Figures

CORRECTION SYSTEM FOR REGULATING THE POWER FACTOR OF AN ELECTRICAL NETWORK

FIELD OF THE INVENTION

The present invention relates to a correction system for regulating the power factor of an electrical distribution network.

BACKGROUND OF THE INVENTION

It is known that, in industrial electric plants having a considerable number of inductive loads, the power factor may easily fall below 70%, for example. However, since many power companies impose a surcharge when the power factor is below a preset value (for example, 90%), it would be advantageous to have a corrective system whereby the power factor may be regulated within acceptable limits thereby avoiding this surcharge.

There are two well known methods of regulating the power factor. In a first system, capacitive loads are connected to the transmission lines. In a second system, capacitive loads are simulated by means of a synchronous motor having a winding over-excited with continuous current. These two systems are frequently used, the second being especially used in cases where the number of reactive KVA is of importance.

OBJECT AND STATEMENT OF THE INVENTION

It is an object of this invention to provide such correction system for regulating power factor of an electrical distribution network, the correction system being based on the measurement of the phase difference between the potential difference and the current of a distribution line.

The correction system in accordance with the present invention comprises: means for sampling the potential difference of a distribution line of the network, means for sampling the current of said distribution line, means generating and storing predetermined reference limits relating to a desired power factor; means for measuring the phase difference based on the sampled potential difference and sampled current of the distribution line; means for comparing the measured phase difference to the reference limits; and means controlling load actuating means connected to the distribution network in response to information received from the comparing means.

The method of controlling the power factor of a distribution network in accordance with the present invention is based on the measurement of the phase angle between the voltage and the current. In the embodiment described hereinbelow, a phasemeter is provided for generating a binary number representive of a voltage which is directly proportional to this phase angle. This binary number is then compared to two reference binary numbers in order to determine one of the following three instances and to carry out the corresponding action:

1. if the power factor is below a first predetermined limit, capacitive loads are added to the distribution line;

2. if the power factor is between said first predetermined limit and a second predetermined limit higher than the first limit, no action is taken; and 3. if the power factor is above said second predetermined limit, capacitive loads are disconnected.

The present invention will be described with reference to capacitive loads being used for correcting the power factor. However, it will be evident to the person skilled in the art that the above described other method and system of correction may also be used with a synchronous motor, the only difference being, however, at the level of the load actuating means which, instead of controlling capacitive loads, control the value of the voltage that serves to over-excite the motor winding.

In one preferred form of the invention, the system further includes a demand monitor for preventing the load actuating means to add capacitive loads when the total power consumption of the installation is low, independently of the actual power factor. Indeed, since the mode of billing used by power companies for industrial installations is based on peak demand, it is quite obvious that correction of the power factor is only desired when the actual power consumption approaches the peak consumption recorded by the power meter of the power company. With such addtional feature, the economical purpose of correcting the power factor is still achieved even though the power factor is not always necessarily maintained between the above-mentioned reference limits. The advantage is threefold. First, if the correction of the power factor was carried out on the actual demand only, small capacitive loads would have to be added when the demand is low and higher capacitive loads when the demand increases; this is thus avoided by regulating the power factor only when the actual demand is higher than a predetermined fraction of the peak demand. Secondly, the present method enables a reduction in the number of commutations of capacitive loads on a given time interval. Thirdly, a "pumping" effect is prevented; for example, if the power factor is below the first reference limit, a capacitive load is added to the distribution line; but if the actual consumption is low, the power factor exceeds the second predetermined limit and the capacitive load is removed.

Other objects and further scope of applicability of the present invention will become apparent from the detailed description given hereinafter; it should be understood, however, that the detailed description while indicating preferred embodiments of the invention is given by way of illustration only since various changes and modifications within the spirit and scope of the invention will become apparent to those skilled in the art from this detailed description.

DESCRIPTION OF PREFERRED EMBODIMENTS

The present correction system for regulating the power factor is based on the measurement of the phase difference, or phase angle, between the potential difference and current of a distribution line.

Figure 1:
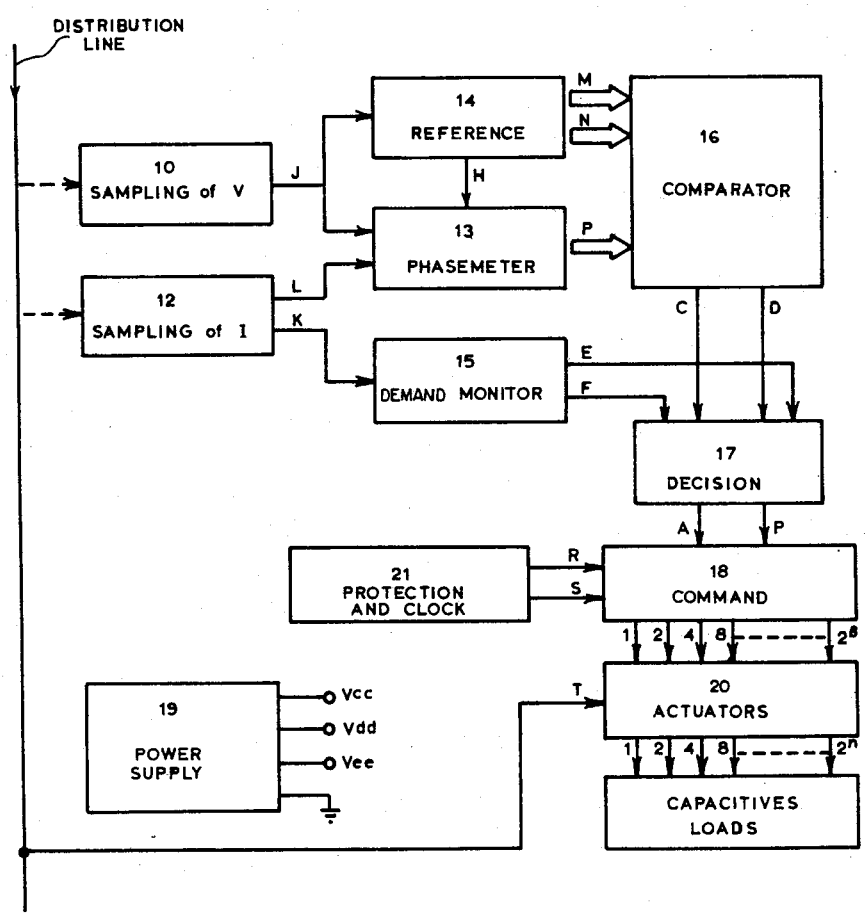
FIG. 1 is a block diagram of a correction system made in accordance with the present invention.

Referring to the block diagram of FIG. 1, blocks 10 and 12 include appropriate circuitry for respectively sampling the potential difference V and the current I of the distribution line in order to transform them into appropriate signals J, K and L which are then fed to a phasemeter 13, a reference block 14 and a demand monitor 15. Block 16 serves to compare the information P received from the phasemeter 13 concerning the actual power factor of the distribution line to predetermined reference limits M and N which were generated and stored in block 14. Let us assume that limits of 90% and 98% are selected for M and N and entered in block 14; however, these limits may vary in accordance with the needs. Three states are possible at the output of block 16:

1. the power factor is below 90%, in which case capacitive loads must be added to the line;
2. the power factor is between 90% and 98%, in which case no action is taken; or
3. the power factor is above 98%, in which case capacitive loads must be removed from the line.

The demand monitor 15 serves to prevent the command block 18 to add capacitive loads to the line when the total electrical consumption of the plant is low, independently of the actual power factor. As explained above, power companies bill on peak demand; hence, it is important that the power factor be corrected only when the actual consumption approaches the peak demand of the power company meter. The demand monitor 15 provides information E and F to the decision block 17. Information E indicates when the command block 18 should stop adding capacitive loads to the line whereas information F indicates that capacitive loads must be removed, independently of information E or of the result of the comparison between the actual power factor P and the two predetermined reference limits M and N (which result is provided on output lines C and D).

If the actual demand is below (for example, 10% of peak demand), capacitive loads must be disconnected to avoid the above-described "pumping" effect and also to prevent the possibility of over-voltage on the power transmission lines.

The decision block 17 combines the inputs C and D from block 16 and E and F of block 15 to provide through outputs A and B an indication to the command block 18 of what operation should be carried out: i.e., connect capacitive loads, disconnect capacitive loads or do nothing at all.

The command block 18 preferably includes a binary counter which is actuated at fixed time intervals by a clock 21 via line S. Its function is to increase or to decrease the total value of capacitive loads connected to the power line. This is carried out by associating, at its least significant output, a load of N KVAR; and, at its following output, a load of 2N KVAR, then, a load of 4N KVAR, etc. Each of these outputs carries an amplifier which controls the operation of the load actuating means 20, which are switches that connect capacitive loads to the distribution line thereby closing the feed back loop T.

The command block 18 includes flip-flops. The first energization of these flip-flops may set them in a given state; the purpose of signal R, which comes from the protection portion of block 21, serves to set these flip-flops at zero at energization.

The power supply block 19 provides the various continuous voltages which are necessary for the proper operation of the present system.

Figure 2:
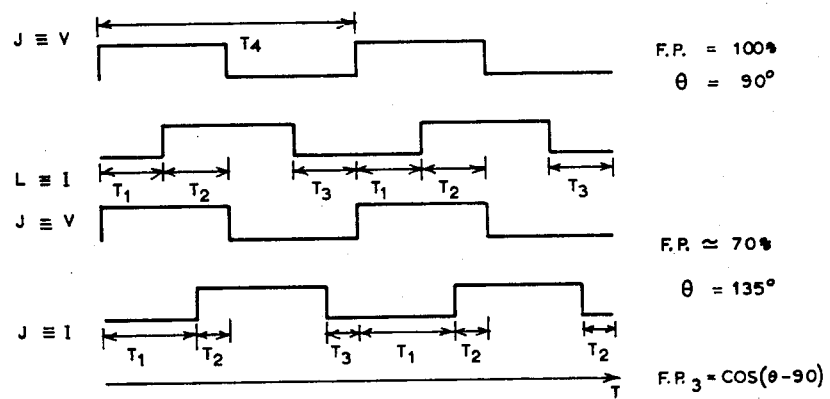
FIG. 2 shows waveforms for measuring phase difference.

The purpose of phasemeter 13 is to measure the actual phase difference between the voltage V and the current I and, consequently, the power factor. FIG. 2 shows possible examples of phase difference to be measured for a three-phase network. It can be seen on this figure that, when the phase difference increases, period T1 increases also. The phase angle is then given by the formula:

$$\theta = (360\ T1)/(T4)$$

In the case of a power distribution network, the period T4 is known and fixed, i.e. $60^{-1}$ second or $50^{-1}$ second depending on geographical areas. The only measurement to be carried out is that of T1. In accordance with the present invention, T1 is measured by means of a binary numerical counter, the content of which is increased by a clock of fixed and stable frequency which has a period much smaller than the period T1. Through an appropriate gate system, it is possible to increase the value of the counter during T1 only.

Figure 3:
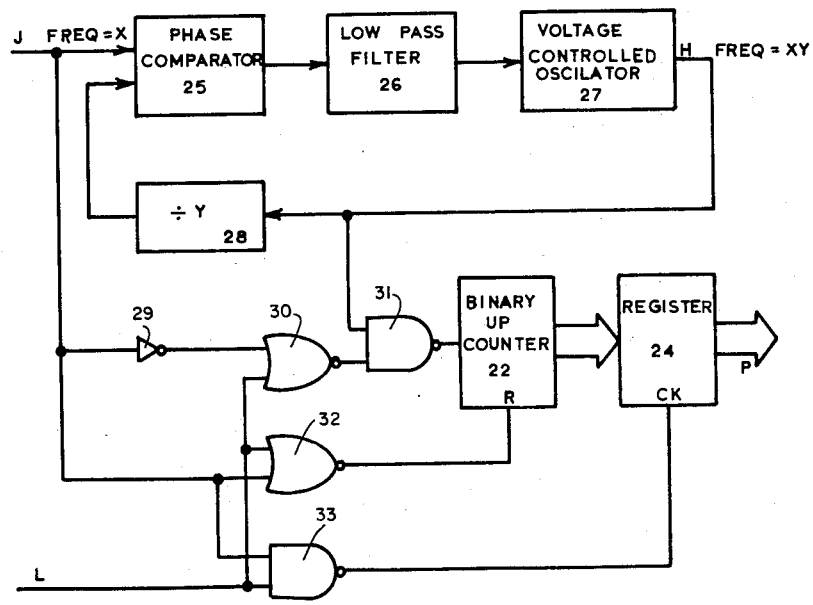
FIG. 3 shows a phasemeter and the generation of clock pulses.

Referring to FIG. 3, this is achieved as follows. Gates 29 and 30 determine T1 of FIG. 2. This indication is used by gate 31 which then sends clock pulses H to the binary counter 22 of FIG. 3. At the end of T1, the binary counter therefore includes a numerical value which is proportional to the phase angle between V and I of the network. T2, such as decoded by gate 33, is used for loading the binary value contained in counter 22 in register 24. The ouput of register 24, therefore, contains the information P. T3 of FIG. 2, such as decoded by gate 32 of FIG. 3, is used to reset at zero the binary counter 22; and the cycle is repeated.

The reference block 14 of FIG. 1 must provide, first, a fixed and stable clock H which is necessary to the phasemeter 13 and, secondly, two limits which are used in the comparator block 16 as references to determine the relative value T1 with respect to these limits. One way of generating H necessary to the operation of phasemeter 13 is to provide an oscillator, the frequency of which may be stabilized by means of a quartz crystal for example. Another way, which is more economical and sufficiently accurate for the present application, consists in the utilization of a frequency multiplication circuit wherein the multiplicand is the frequency of the power line, which is fixed and stable, and the multiplicator is a number of sufficient value to provide adequate precision to the measurement of T1. The frequency multiplication circuit is based on a phase locked loop circuit. Block 25 of FIG. 3 compares the phase angle between signal J, which is derived from the network voltage, and the output signal of the block 28 divides by Y. For example, if the output frequency at 28 tends to be smaller than the network frequency at J, the phase varies between these two signals and the phase comparator 25 increases or decreases the voltage which is present at the input of the low pass filter 26. This voltage is then filtered and presented at the input of the voltage controlled oscillator 27 which readjusts its output frequency so that the system returns to equilibrium. At such time, the output frequency of block 28 must be equal to the network frequency. In these conditions, the output frequency of the voltage controlled oscillator 27 must be equal to the line frequency multipled by Y. In order to illustrate the whole operation of the system, let us take for example number 512 as multiplicator Y and number 60 as multiplicand X. These numbers are selected only for descriptive purposes and can be replaced by other numbers. Under these conditions, the output frequency of clock H of FIG. 1 would be 30.72 KHz. Therefore, the number which will appear at time T2 in register 24 will be 128 for a phase difference $\theta$ of 90°,

166 for a phase difference θ of 117°, etc. This number P equals (θ Y)/(360) and is independent of the value of X.

From what has been said above, the binary number P in FIG. 1 represents the actual power factor. By means of a simple resistance network, this binary number can be changed into an analog voltage which can be applied on an analog voltmeter. This analog voltmeter, if correctly graduated and calibrated, will give a direct reading of the actual power factor.

Furthermore, it is possible to obtain a numerical reading of the actual power factor by using memories which are programmed to transform the binary number P into decimal numbers. These memories, in fact, constitute a reference table in which are associated the real decimal value of the actual power factor and a given binary number. By means of memories which provide the inverse conversion, it is also possible to program reference N of FIG. 1 by inscribing by means of commutators (for example thumb wheel switches) the decimal values of the predetermined lower limit of the power factor, the upper predetermined limit being fixed.

What is claimed is:

1. A correction system for regulating the power factor of an electrical distribution network, comprising:
    means for sampling the potential difference of a distribution line of said network;
    means for sampling the current of said distribution line;
    means generating and storing first and second predetermined reference limits relating to desired power factors;
    means for measuring the phase difference based on the sampled potential difference and the sampled current;
    means for comparing the measured phase difference to said predetermined reference limits;
    means for monitoring the actual demand of said electrical distribution network; and
    means for controlling load actuating means connected to said distribution network in response to information obtained from said comparing means and information obtained from said monitoring means; said load actuation means being connected to capacitive loads whereby one or more capacitive loads may be added to the distribution network when the measured phase difference indicates a corresponding power factor which is below a first of said predetermined reference limits, and may be disconnected from the distribution network when the measured phase difference indicates a corresponding power factor which exceeds a second of said reference limits greater than said first limit; said controlling means being responsive to information obtained from said monitoring means to prevent capacitive loads from being added to the distribution network when the actual demand monitored by said monitoring means is below a predetermined demand value, independently of said information received from said comparing means.

2. A correction system as defined in claim 1, where the reference frequency necessary for the measurement of the phase angle between potential V and current I is based on multiplication of the line frequency.

3. A correction system as defined in claim 2, wherein said load actuating means include a binary counter and a clock for actuating said counter at predetermined fixed time intervals.

4. A method of regulating the power factor of an electrical distribution network, comprising the steps of:
    sampling the potential difference of a distribution line of said network;
    sampling the current of said distribution line;
    generating and storing predetermined reference limits pertaining to a desired power factor;
    measuring the phase difference based on the sampled potential difference and the sampled current;
    comparing the measured phase difference to said predetermined reference limits;
    monitoring the actual demand of said distribution network; and
    controlling load actuating means connected to said distribution network in response to information obtained from the comparison of the measured phase difference to the predetermined reference limits and in response to information obtained from said monitoring; said controlling consisting of connecting one or more capacitive loads to the distribution network when the measured phase difference is below a first of said predetermined reference limits; and disconnecting capacitive loads from the distribution network when the measured phase difference exceeds a second of said reference limits greater than said first limit; said controlling further consisting of preventing capacitive loads to be connected when the actual demand monitored is below a predetermined demand value.

* * * * *